(12) United States Patent
Deshpande et al.

(10) Patent No.: US 8,973,029 B2
(45) Date of Patent: Mar. 3, 2015

(54) BACKPROPAGATING A VIRTUAL CAMERA TO PREVENT DELAYED VIRTUAL INSERTION

(75) Inventors: Nikhil Deshpande, Pennington, NJ (US); Gregory House, Doylestown, PA (US)

(73) Assignee: Disney Enterprises, Inc., Burbank, CA (US)

( * ) Notice: Subject to any disclaimer, the term of this patent is extended or adjusted under 35 U.S.C. 154(b) by 1274 days.

(21) Appl. No.: 12/750,319

(22) Filed: Mar. 30, 2010

(65) Prior Publication Data

US 2010/0251287 A1    Sep. 30, 2010

Related U.S. Application Data

(60) Provisional application No. 61/165,370, filed on Mar. 31, 2009.

(51) Int. Cl.
*H04N 7/10* (2006.01)
*G11B 27/28* (2006.01)
*G11B 27/036* (2006.01)

(52) U.S. Cl.
CPC ............. *G11B 27/28* (2013.01); *G11B 27/036* (2013.01)
USPC ................... 725/32; 725/33; 725/34; 725/35; 725/36; 348/169; 348/589; 348/600

(58) Field of Classification Search
CPC ..... G11B 27/031; G11B 27/036; G11B 27/28
USPC ........................ 725/32–36; 348/169, 589, 600
See application file for complete search history.

(56) References Cited

U.S. PATENT DOCUMENTS

| | | | |
|---|---|---|---|
| 5,264,933 A | 11/1993 | Rosser et al. | |
| 5,953,076 A | 9/1999 | Astle et al. | |
| 6,208,386 B1 * | 3/2001 | Wilf et al. | 348/578 |
| 6,370,199 B1 * | 4/2002 | Bock et al. | 375/240.28 |
| 6,741,725 B2 * | 5/2004 | Astle | 382/103 |
| 7,015,978 B2 * | 3/2006 | Jeffers et al. | 348/586 |
| 2006/0026628 A1 * | 2/2006 | Wan et al. | 725/32 |
| 2009/0259941 A1 | 10/2009 | Kennedy, Jr. | |
| 2010/0020068 A1 * | 1/2010 | House | 345/419 |

OTHER PUBLICATIONS

U.S. Appl. No. 12/403,857, filed Mar. 13, 2009, Gefen et al.

* cited by examiner

*Primary Examiner* — Christopher S Kelley
*Assistant Examiner* — Maria Vazquez Colon
(74) *Attorney, Agent, or Firm* — Fay Kaplun & Marcin, LLP

(57) ABSTRACT

A method for video insertion using backpropagation may include determining a first camera model from a first frame of the sequence. The method may also include determining a transition location. The method may further include generating a transform model based on an analysis of the first frame and a second frame that occurs earlier in the video sequence and applying the transform model to the first camera model to generate a second camera model for the second frame. The method then includes inserting an insertion into one or more frames earlier in the sequence between the second frame and the transition location based on the second camera model, wherein the inserting is performed before displaying the frames. A system for video insertion using backpropagation includes search, transition, track and insertion subsystems.

34 Claims, 9 Drawing Sheets

| Frame no. (new on left, old on right) 302 | x | x-1 | x-2 | x-3 | | x-n-1 | x-n Display |
|---|---|---|---|---|---|---|---|

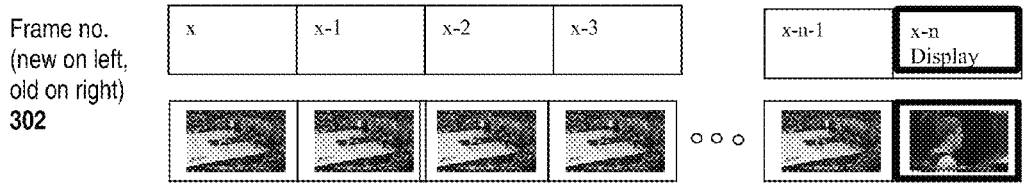

| | x | x-1 | x-2 | x-3 | | x-n-1 | x-n |
|---|---|---|---|---|---|---|---|
| Default track: | No | Yes | Yes | Yes | | Yes – 1st | No |
| Good track: | Yes – 1st | No | No | No | | No | Previous |
| Recognition: | Yes – 1st | No | No | No | | No | Previous |
| 3-D model | Yes | No | No | No | | No | Previous |
| Scene cut: | No | No | No | No | | Yes | No |

State 310: Recognition on frame x

| | x | x-1 | x-2 | x-3 | | x-n-1 | x-n |
|---|---|---|---|---|---|---|---|
| Default track: | No | Yes | Yes | Yes | | Yes | No |
| Good track: | Yes | No | No | No | | No | Previous |
| Recognition: | Yes | No | No | No | | No | Previous |
| 3-D model | Yes | No | No | No | | No | Previous |
| Scene cut: | No | No | No | No | | Yes | No |

State 320: Search back through buffer to find scene cut

| | x | x-1 | x-2 | x-3 | | x-n-1 | x-n |
|---|---|---|---|---|---|---|---|
| Default track: | No | Remove | Yes | Yes | | Yes | No |
| Good track: | Yes | Yes | No | No | | No | Previous |
| Recognition: | Yes | No | No | No | | No | Previous |
| 3-D model | Yes | Yes | No | No | | No | No |
| Scene cut: | No | No | No | No | | Yes | No |

State 330: Begin backpropagation: use frame x model and reverse affine of x-1 default track to obtain a 3-D model and good tracking affine for frame x-1

| | x | x-1 | x-2 | x-3 | | x-n-1 | x-n |
|---|---|---|---|---|---|---|---|
| Default track: | No | Remove | Remove | Remove | | Remove | No |
| Good track: | Yes | Yes | Yes | Yes | | Yes | Previous |
| Recognition: | Yes | No | No | No | | No | Previous |
| 3-D model | Yes | Yes | Yes | Yes | | Yes | No |
| Scene cut: | No | No | No | No | | Yes | No |

State 340: Repeat backpropagation frame by frame to scene cut. Now ready to shift pipeline forward and display frame x-n-1

| x+1 | x | x-1 | x-2 | | x-n | x-n-1 Display |
|---|---|---|---|---|---|---|

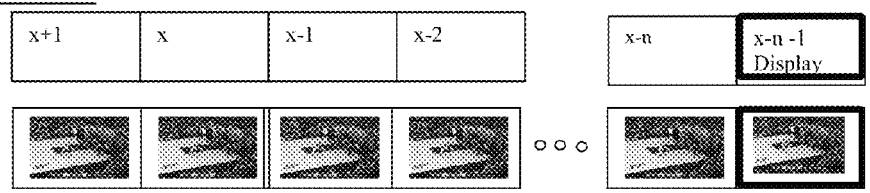

FIG. 3

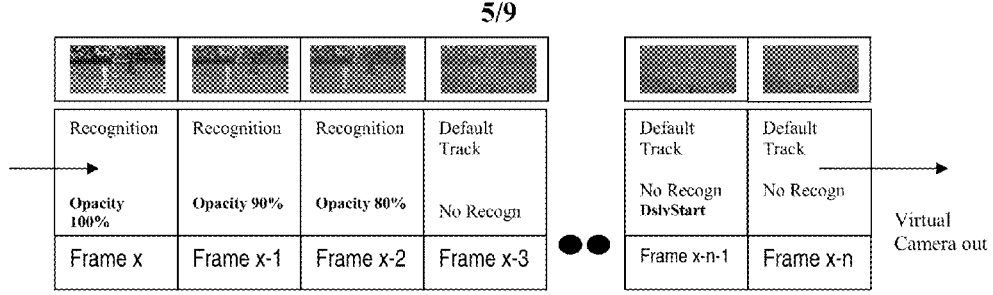
440  Backpropagate the new virtual camera in Frame x-1 to Frame x-2.
Reduce the opacity of the virtual to match a linear dissolve
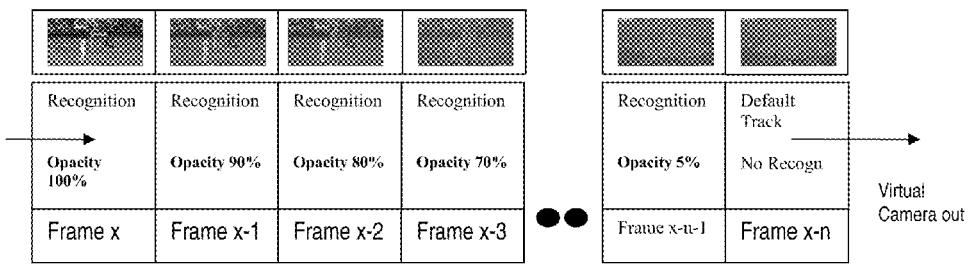
450  Backpropagate until the start of the dissolve marker is reached.
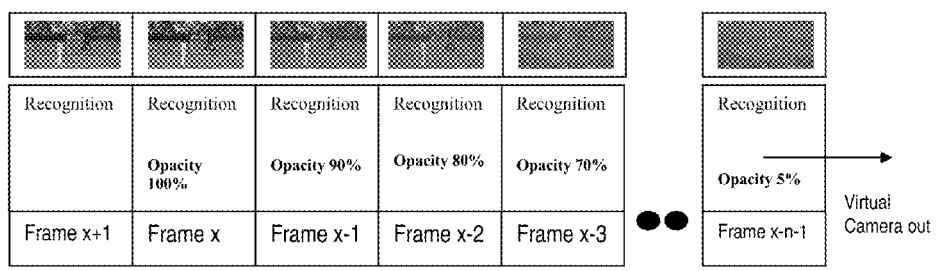
460  On the next video clock x-n-1 will be sent out of the buffer with recognition i.e. a valid virtual camera
FIG. 4B Example occlusion color processing over scene transition

BACKPROPAGATING A VIRTUAL CAMERA TO PREVENT DELAYED VIRTUAL INSERTION

CROSS REFERENCE TO APPLICATIONS

This application claims priority to U.S. Provisional Patent Application No. 61/165,370, filed on Mar. 31, 2009, the entire contents of which are hereby incorporated by reference.

TECHNICAL FIELD

Embodiments of the present invention relate to video scene recognition and the insertion of virtual graphics into a video stream in real time.

BACKGROUND

Television, film and computer graphics industries usually attempt to make video insertions to a scene of a video sequence as seamless as possible. For example, the virtual insertion should appear to a viewer of the video sequence, to be part of the original scene and the addition of the virtual insertion should not expose any visual artifact unless required by the specification. In broadcast television, automated scene recognition has been used, for instance, to insert virtual advertising and graphic effects into live and recorded broadcasts as described in more detail in, for instance, U.S. Pat. No. 5,264,933 entitled "Television displays having selected inserted indicia" issued to Rosser, et al. on Nov. 23, 1993, the contents of which are hereby incorporated by reference in their entirety.

Most automatic search methodologies employed in the field of adding virtual insertions to a scene in a video sequence take a finite time to execute and often the result of the search may only be available at a later point in time, after one or more frames containing views of substantially the same scene have already been presented to the viewer. This may, for instance, occur after a discontinuity, such as, but not limited to, a cut, a dissolve or a special effect. This may lead to a problem termed "late turn-on" where the virtual insertion may not be inserted in the scene in the first frame or even several subsequent frames after the scene becomes part of the video stream. That is, the virtual insertion will not occur at the so-called scene boundary but will first appear at a later point in time in the video sequence.

This sudden appearance of a virtual insertion into a sequence of similar scenes after not being in an initial view of a similar scene, may be immediately picked up by the human eye, even if there is high motion in the scene, or the view of the scene is being distorted by, for instance, the scene being panned, zoomed or rotated.

In the case of a simple cut transition, such as a stream of video frames in which the scene being displayed switches from one scene to an unrelated scene on subsequent frame, it may be possible to have a sufficiently large delay of the video frames being displayed by the viewer. Even a search algorithm that takes many frames to produce a result may work sufficiently well to have the required insertion components available by the time the frames are to be displayed to the viewer.

Most video streams of interest, however, typically have other transitions besides scene cuts, including, but not limited to, dissolves, fades and graphical transition effects which a simple delay solution may not solve as effectively as broadcast standards require or as viewers expect. Moreover, practical constraints make it typically not feasible, or desirable, to have too great an increase in the pipeline delay of the video. The total processing delay may, for instance, need to be made small and of fixed length because of hardware and cost constraints, and because many other processing subsystems typically run at various fixed stages in the pipeline.

There is, therefore, a continuing need to minimize, or eliminate, any delay in the occurrence of a virtual insertion after a change in scenes in a video stream.

SUMMARY

Embodiments of the present invention are directed to minimizing or eliminating any delay in the occurrence of a virtual insertion after a change in scenes in a video stream. Image processing algorithms may be given time to process the scene without producing video pipeline delays that are too long or too variable. Embodiments of the present invention may use backpropagation. Backpropagation effectively propagates results of a delayed search backwards in time along the stream of video so that the virtual insertion may be displayed appropriately at the scene boundary thereby eliminating the visual artifact of a delayed insertion.

According to an embodiment, a method for video insertion using backpropagation may include determining a first camera model from a first frame of the sequence. The method may also include determining a transition location in the sequence based on a transition. A transition may include, for instance, a cut or fade in the video sequence. The transition location may include a position of the transition in the video sequence, a position in the vicinity of a transition in the video sequence, or one or more frames associated with the transition. The transition location may be earlier in the sequence than the first frame. The method may further include generating a transform model based on an analysis of the first frame and a second frame that occurs earlier in the sequence. The transform model is applied to the first camera model to generate a second camera model for the second frame. The method then includes inserting an insertion, such as a graphic or advertisement, into frames earlier in the sequence between the second frame and the transition location based on the second camera model. The insert may be made before displaying the frames. According to a further embodiment, the applying step may be repeated to generate a camera model for the frames earlier in the sequence between the second frame and the transition location and insert the insertion in the frames based on the camera model for the frames.

A system for video insertion using backpropagation may include a search subsystem to determine a first camera model from a first frame of the sequence, according to another embodiment. The system may also include a transition subsystem to determine a transition location in the sequence based on a transition. The transition location may be earlier in the sequence than the first frame. The system may further include a track subsystem configured to generate a transform model based on an analysis of the first frame and a second frame that occurs earlier in the sequence and apply the transform model to the first camera model to generate a second camera model for the second frame. The system may further include an insertion subsystem to insert an insertion into frames earlier in the sequence between the second frame and the transition location based on the second camera model. The insert may be performed before the frames are displayed. The apply step may be repeated to generate a camera model for one or more frames earlier in the sequence between the second frame and the transition location and insert the insertion into the frames based on the camera model or models. A buffer may also be included.

Another method for video insertion using backpropagation may include determining a first camera model from a first frame of the sequence, according to an embodiment. The method may also include generating a second camera model for a second frame by applying a transform model to the first camera model, wherein the transform model is based on an analysis of the first frame and a second frame. The method may then further include inserting an insertion into one or more frames between the first frame and an earlier index frame of the sequence based on the second camera model. The generating and inserting may be performed in real time before displaying the frames.

Another system for video insertion using backpropagation may include a search subsystem to determine a first camera model from a first frame of the sequence, according to an embodiment. The system may also include a track subsystem configured generate a camera model for a second frame by applying a transform model to the first camera model, wherein the transform model is based on an analysis of the first frame and a second frame. The system may further include an insertion subsystem to insert an insertion into one or more frames between the first frame and an earlier index frame of the sequence based on the second camera model. The insertion may be performed in real time before the frames are displayed.

BRIEF DESCRIPTION OF THE FIGURES

The accompanying drawings, which are incorporated herein and form part of the specification, illustrate embodiments of the present invention and, together with the description, further serve to explain the principles of embodiments of the invention and to enable a person skilled in the relevant art(s) to make and use embodiments of the invention

FIG. 3 is a schematic diagram of some representative states of the video pipeline during backpropagation to a scene cut, according to an embodiment.

Figure 1:
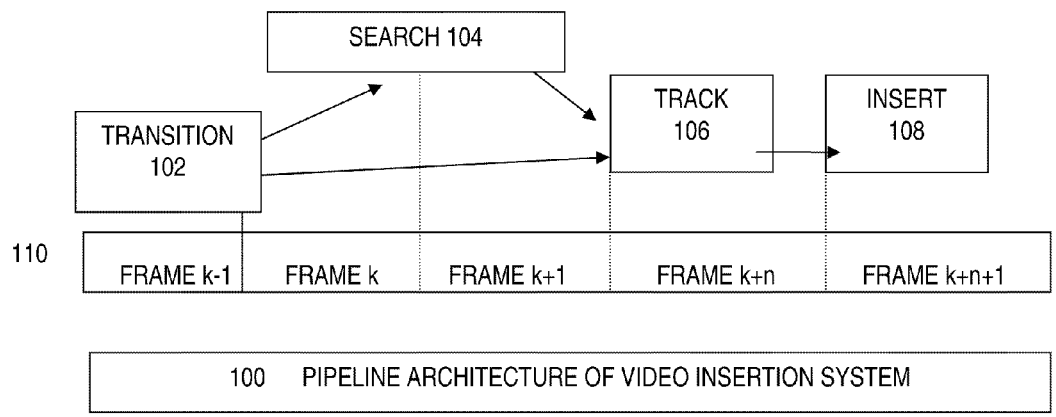
FIG. 1 is a schematic diagram of a pipeline architecture of a computer vision based virtual insertion system, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This specification discloses one or more embodiments that incorporate the features of this invention. The disclosed embodiments merely exemplify the invention. The scope of the invention is not limited to the disclosed embodiments. The invention is defined by the claims appended hereto.

The embodiments described, and references in the specification to "one embodiment", "an embodiment", "an example embodiment", etc., indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the present invention are directed to minimizing or eliminating any delay in the occurrence of a virtual insertion after a change in scenes in a video stream. Image processing algorithms may be given time to process the scene without producing video pipeline delays that are too long or too variable. Embodiments of the present may use a technique termed backpropagation. Backpropagation effectively propagates results of a delayed search backwards in time along the stream of video so that the virtual insertion may be displayed appropriately at the scene boundary thereby eliminating the visual artifact of a delayed insertion.

Embodiments may be used in conjunction with other software and hardware modules, such as, but not limited to, a video transition detector capable of detecting a variety of video scene boundaries, including, but not limited to, cuts, dissolves or effects that may be set by standard video switching equipment. Embodiments may also be used in conjunction with a hardware or software module, such as a video tracker module capable of tracking a scene to recover useful data, such as, but not limited to, virtual camera motion.

Advantages or effects of the embodiments include, but are not limited to, neutralizing the inherent delays of typical search algorithms while only minimally increasing the video stream delay, or processing, pipeline. It is useful for real-time automated scene recognition for a significantly wide range of video and streaming images. Applications include but are not limited to the broadcast of live sporting events, such as American football, soccer, basketball, soccer, tennis, etc. It may be particularly useful for modifying the video stream of the broadcast at a location remote from the venue, where it may be difficult to obtain camera field of view (FOV) data from sensor measurements of the tripod and lens affiliated with a camera. Furthermore, embodiments of this invention may be advantageous for broadcasts where insertions are made in video from multiple cameras, as insertions may be made downstream without the need for tally signals from the broadcaster.

These and other features of the embodiments will be more fully understood by references to the following drawings. Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Embodiments of this invention can be used for applications where scenes need to be recognized in video. Examples may include recognition of scenes in order to add advertising logos, sporting event statistics, or other types of virtual insertions to broadcast video, for example. This may apply to platforms streaming video media, including but not limited to television (e.g., broadcast, cable, satellite, fiber), the Internet, and mobile devices (e.g., cellular telephones or other wireless devices).

Embodiments of the present invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

An insertion system for program video with the following components is shown in FIG. 1, according to an embodiment. A pipelined architecture 100 may be used that allows for the processing delay of the system to be larger than the time between successive frames. The input video may be passed through a buffer that is used to process the image with each subsystem working on appropriately delayed video. Transition (102), search (104), track (106) and insert (108) subsystems, shown in FIG. 1, may be or may be executed by computing devices. Examples of computing devices include, but are not limited to, a computer, workstation, distributed computing system, computer cluster, embedded system, stand-alone electronic device, networked device, mobile device (e.g. mobile phone, smart phone or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and graphical user interface display.

The search subsystem (104) may generate a virtual camera model from a frame in the video stream, according to an embodiment. A camera model may be determined from an object in an image of a frame or an environment or playing surface associated with images in a frame. Search may be the most computationally intensive part of an algorithm and may require a time budget larger than the time between successive frames. The subsystem emits a result k+n frames after the search was initiated on frame k. Once a virtual camera is obtained the Track subsystem (106) may update the initial search virtual camera by extracting dominant background camera motion from successive frames in a video stream. This subsystem may have to work in frame time as it needs to emit a valid result for every frame of video. The subsystem may be pipelined, i.e., it works on a delayed version of the video and could be at least k+n frames behind the search subsystem thereby enabling the search result for the kth frame to be used in time.

Another critical subsystem when working with program video is a subsystem that determines scene transitions, according to an embodiment. The Video Transition subsystem (102) may identify a type (cut, dissolve, effect) of the transition. Transition subsystem 102 may also identify a transition location, such as a temporal position of one or more transition frames in the video stream. In some cases transition information may include one or more frames in a first portion of the transition location produced by a different camera. This information can be used to restart search if it is in the middle of a long search loop for the kth frame or can be used to reliably terminate the current track cycle and reset the system. Typically this subsystem will run as the first stage of the pipeline with no delay. The Insertion subsystem (108) may generate a virtual graphic with the right perspective for the camera model supplied by the track subsystem as well as create the appropriate mask so that the graphic can be mixed with the video stream. It typically runs at a pipeline stage right behind the Track subsystem and is delayed to account for the search processing delay as well as the track subsystem delay (k+n+1).

The search subsystem (104) may attempt to generate a virtual camera model through scene analysis, according to an embodiment. A camera model may be generated and calculated as a 3×3 matrix. The camera model may also be generated using other dimensional matrices. Matrix parameters may include camera external parameters, such as camera position coordinates, and internal parameters, such as sensor vertical and horizontal scale factors. The virtual camera model may contain multiple parameters that relate to physical measurements such as pan, tilt, roll, image distance, x position, y position, z position. Other parameters, such as parameters for radial lens distortion for example, may be utilized. Other methods, such as methods based on homography for example, may be utilized and the embodiments of present invention is not meant to rely on a particular means to calculate a camera model. For example, the camera model may simply provide a homographic relation between the current camera view and some physical reference, such as the plane containing the basketball court. In another example, the camera model may include a homographic mapping between the input view and a reference image of the scene, wherein the reference image is used to define the location of a graphical insertion.

The search subsystem (104) may hand off the virtual camera model to the track subsystem (106), which may update the model on a frame to frame basis. Tracking algorithms may use texture scene trackers such as C-TRAK™ (U.S. Pat. No. 6,741,725, hereby incorporated by reference in its entirety) to provide a reliable track. At the same time a transition subsystem examines each video frame and decides whether this is the first field of a new scene and, if so, it may identify the nature of the transition. The track subsystem provides a virtual camera for every frame that it sees to the insertion subsystem. The track system identifies areas of the frame that are good for tracking, referred to as "tracking blocks". These "tracking blocks" may be reference image segments that are used to analyze multiple images in a sequence. Alternately, the blocks may be image segments within the successive frames used for direct comparison of the frames themselves. Furthermore, other methods include, but not limited to, matching templates, keypoints, lines, areas of texture, gradients, histogram analysis, optical flow, and other image processing techniques. Successfully generating a virtual camera for the frame is known as having "recognition". The tracking change may be represented as the homographic mapping between successive frames.

The virtual camera may then be used by an insertion subsystem 108 to create a view of the insertion (static artwork, animation, 3 dimensional rendered objects or other video) with the appropriate perspective deformations so as to appear as part of the 3D world that the video frame represents. In some cases, it may be attached to a portion of a scene such as an advertisement on the playing surface in video covering a basketball game. In other cases, the graphic may appear to be tied in part to an object moving in the scene, such as a highlight of a basketball player. Furthermore, it may associate with both the scene and an object, such as a trail following behind a basketball player. The insertion usually has a means of controlling the opacity and/or shape of the insert with a key/alpha channel According to an embodiment, insertion subsystem 108 may realize the visual effect that foreground objects, such as 522 in FIG. 5, appear to be in front of background insertion graphics 524. To ensure that foreground objects do not interfere with the pixels of the insertion color, processing may be performed to extract the dominant background color. The backpropagation camera model may be used to direct the color analysis of the input image, such as in the insert region or on the playing surface. This color of the background may be used to create a mask that contains the differentiation between the foreground and background pixels, such as U.S. Pat. Nos. 5,953,076 and 7,015,978. This mask may be mixed with the key channel to create a key that accounts for foreground objects. The fill may then be mixed with the background video using the masked key to generate pixels that appear to be part of the background. Overlap between foreground pixels and background insert may be correctly handled using this scheme.

Figure 2:
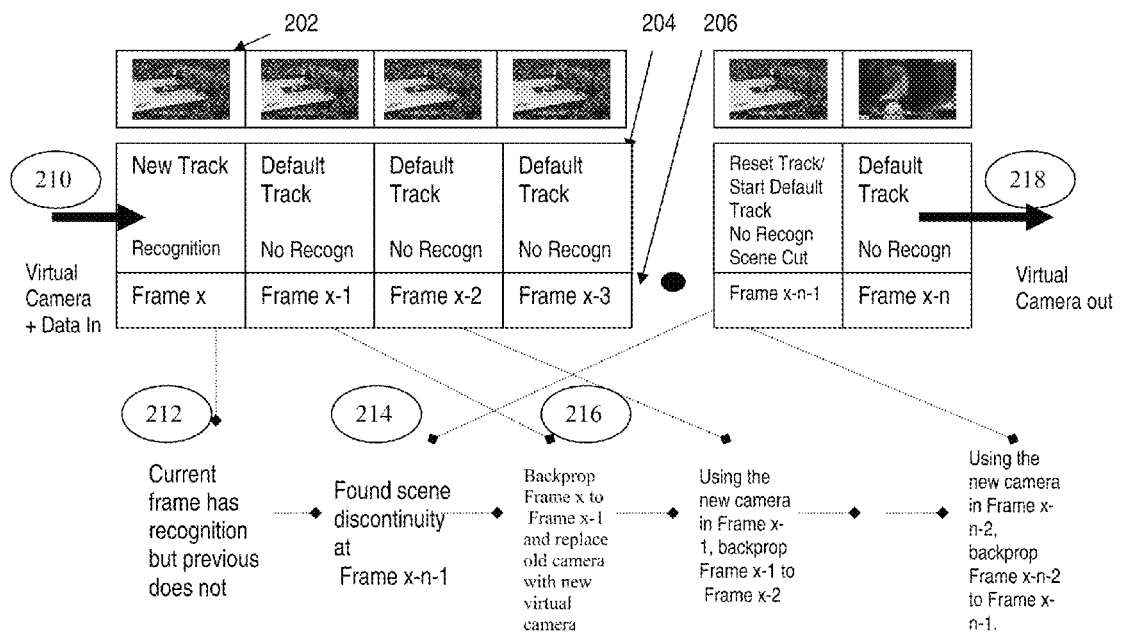
FIG. 2 is a schematic diagram of an exemplary Backpropagation Buffer architecture and operation, according to an embodiment.

According to an embodiment, the first stage in the backpropagation architecture is a FIFO (First In First Out) buffer situated between the track subsystem 106 and the insertion subsystem 108, as shown in FIG. 2. This may increase the processing pipeline length over a minimal configuration. The length of this buffer can vary based on the constraints provided by the video stream as well as the operational requirements to have the best performance. This buffer may store the following info: 1) Virtual camera model information from track subsystem 106; 2) a mathematical transform describing the motion of the track blocks from one frame to the next or the entire frame itself if there is a need to track backwards; and 3) the transition subsystem results. The buffer in turn may send a delayed virtual camera model to the insertion subsystem.

Given a number of track blocks in one frame of video, the track subsystem may find the blocks in the next frame. This may be viewed as a homographic mapping between video frames. The difference between the old and new positions across 2 adjacent frames may be used to calculate an affine transformation model—"$T_k$". $T_k$ is the transform that can be used to calculate the new virtual camera model for the detected track blocks in frame k from the old camera model created in frame k−1.

$$T_k * C_{k-1} = C_k$$

This transformation must be invertible, or T*Inv(T)=I where I is the identity matrix. This transformation model may be used to calculate a virtual camera model. As "T" is invertible, embodiments of the system may effectively track backwards in time. The inverse transform may be applied to the current camera to get the previous frames camera:

$$Inv(T_k) * C_k = C_{k-1}$$

Another item of interest is the way in which the backpropagation methodology is used to backpropagate our delayed recognition virtual camera, according to another embodiment. This may be advantageous to ensure that tracking is working even when there is no recognition. When no recognition exists, tracking may be launched with some default camera model. This model does not have to be accurate if the focal length of the standard scene is >20 mm. Perspective effects may begin to play a significant role below this level. This default camera model may be used to generate the transform that is placed in the backpropagation buffer. When delayed recognition occurs these transformations may be used to propagate the model back in time.

FIG. 2 illustrates backpropagation, according to an embodiment, starting with the first frame 202 of a new scene following a scene discontinuity or transition 210. Newer frames enter at 210 and exit at 218. Box 204 shows whether there is recognition and box 206 identifies the frame in the sequence. The steps may include the following:

If there is no recognition, proceed to put information in backpropagation buffer.

If no recognition, then start tracking with a default camera and put information in the backpropagation buffer.

When recognition occurs, first check in the buffer to see that it is delayed recognition 212.

If it is delayed recognition, parse through the buffer to find the first scene discontinuity that was detected and store that frame index. (214 in FIG. 2).

Take previous fields virtual camera model and use a simple predictor to predict what the current camera would have been had recognition not occurred.

Use the inverse transform to calculate the previous fields' recognition camera and replace the old default tracking camera with the new backpropagated camera 216.

Go back in time from the current frame to the index the scene discontinuity was detected one adjacent pair at a time and use the transform generated from the default track camera and the current recognition camera to calculate the previous frames recognition camera.

In the case of dissolves, modify the opacities of the insertion so that recognition visually appears to occur at some point within the dissolves.

If no discontinuity was found in the buffer then backpropagate the camera model throughout the buffer and modify the opacity of the insert to fade the logo into the scene.

FIG. 3 is a schematic representation of some representative states of the backpropagation buffer during a scene cut, according to an embodiment. The Backprop buffer 302 is shown for an n−1 frame delay. The states of the system that are saved in the buffer are listed under the backpropagation buffer. The newest frame 'x' enters the buffer on the left and the oldest frame x−n leaves the buffer on the right. The first state 310 is the acquisition of delayed recognition on frame x that is x−n−1 frames after the scene cut at frame x−n. At this point a default track with some default virtual camera is being used to maintain track of the frames x−n−1 to x. There may be no recognition on the tracked frames until frame x. At frame x, the search subsystem may have succeeded and sent a valid virtual camera. Tracking now may have been initiated with this camera resulting in a valid 3D model. Meanwhile the transition subsystem has determined that a scene cut occurred on frame x−n−1.

The next phase after recognition is to scan through the buffer to find the nearest scene discontinuity to the delayed recognition 320. The scene cut position in the buffer may be saved and then backpropagation may be started 330 for frame x−1 using the default track data. The default camera may be removed and a valid 3D camera may be placed in the buffer at position x−1. The recognition status may also be changed to "recognized." Backpropagation may now be repeated 340 for the next frame x−2 using the recognized 3D camera from frame x−1 and the default unrecognized tracked virtual camera from frame x−2. This operation may be repeated until all frames from x to x−n−1 have a recognized 3D camera. When the next frame of video is input into the backpropagation buffer the pipeline may be shifted one stage to the right and the x−n−1 virtual camera is sent to the insertion subsystem.

Figure 4A:
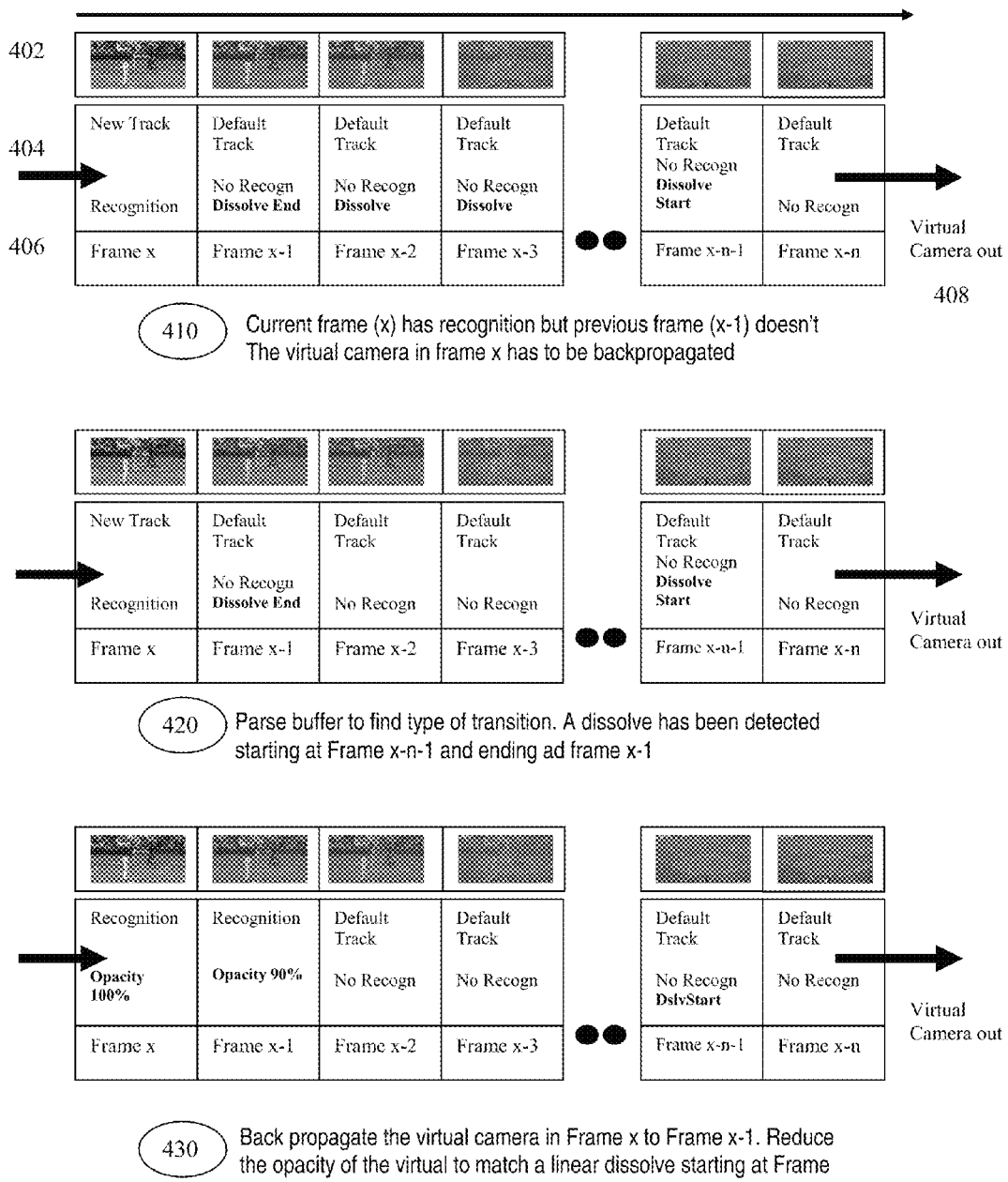
FIG. 4 is a schematic diagram of some representative states of the video pipeline during backpropagation to a dissolve, according to an embodiment.

FIG. 4 details a schematic representation of some representative states of the backpropagation buffer pipeline during a dissolve, according to an embodiment. Frames are shown at 402, tracking information is shown at 404 and frames are identified at 406. In this case, an opacity value may also be saved in the buffer that assists with ensuring that the insertion subsystem outputs an insert at a gradually increasing opacity so as to closely approximate the dissolve. A series of n−1 frames may be buffered as before. The dissolve may have occurred at frame x−n−1 that has delayed the recognition process until the scene has stabilized to some extent in frame x, which may have caused the search subsystem to successfully generate a valid 3D virtual camera representing the scene 410. As soon as recognition is detected in the buffer preceded by a buffer with n, recognition, the backpropagation scheme may be attempted. The buffers may be scanned to find the closest transition 420 and a dissolve is detected at frame x−n−1. The 3D camera at frame x may then be backpropagated to frame x−1 and the opacity associated with the virtual camera may be decreased from 100% in frame x to 90% in frame x−1 430. The assumption may be a linear dissolve from frame x to frame x−n−1. The backpropagation operation may now be repeated for frame x−2 using the newly backpropagated 3D virtual camera from frame x−1 440 and a valid 3D model, i.e., recognition replaces the unrecognized default track camera in that buffer.

The opacity value stored in the buffer may also be reduced linearly, according to a further embodiment. Backpropagation may continue until the start frame of the dissolve is reached at frame x−n−1 450. At this point the opacity may have linearly been decreased to 5%. On the next video frame, the buffer may be shifted right by one frame to allow for the new frame x+1 to enter on the left and the buffer x−n−1 may be sent to the insertion subsystem 460. The insertion subsystem may mix the insert with the background video with 5% opacity and as the video frames may be incremented and the buffer shifts out all x−n−1 frame states the opacity will rise to its final 100% opacity In one embodiment of this invention, the frame to frame tracking that backpropagates that camera model from the recognition frame may itself be performed backwards in time. For example in FIG. 4, the recognition for Frame x may be performed prior to determining the track change between Frame x and Frame x−1 in Step 420. This may permit the recognition model to guide the location of features in the scene potentially to improve the reliability of the tracking. The recognition model may be determined for Frame x−1 in Step 430 prior to determining the tracking change between Frames x−1 and x−2. Again, the recognized model may guide the placement of tracked features. This process may repeated for successive frames in the buffer as indicated in Step 460. In another embodiment, the default tracking may be performed as in FIG. 4, but the track model is refined using features determined using the recognition model. This may be a variation of the iterative search approach discussed in U.S. Provisional Patent 61/160,117, which is incorporated by reference.

Figure 5:
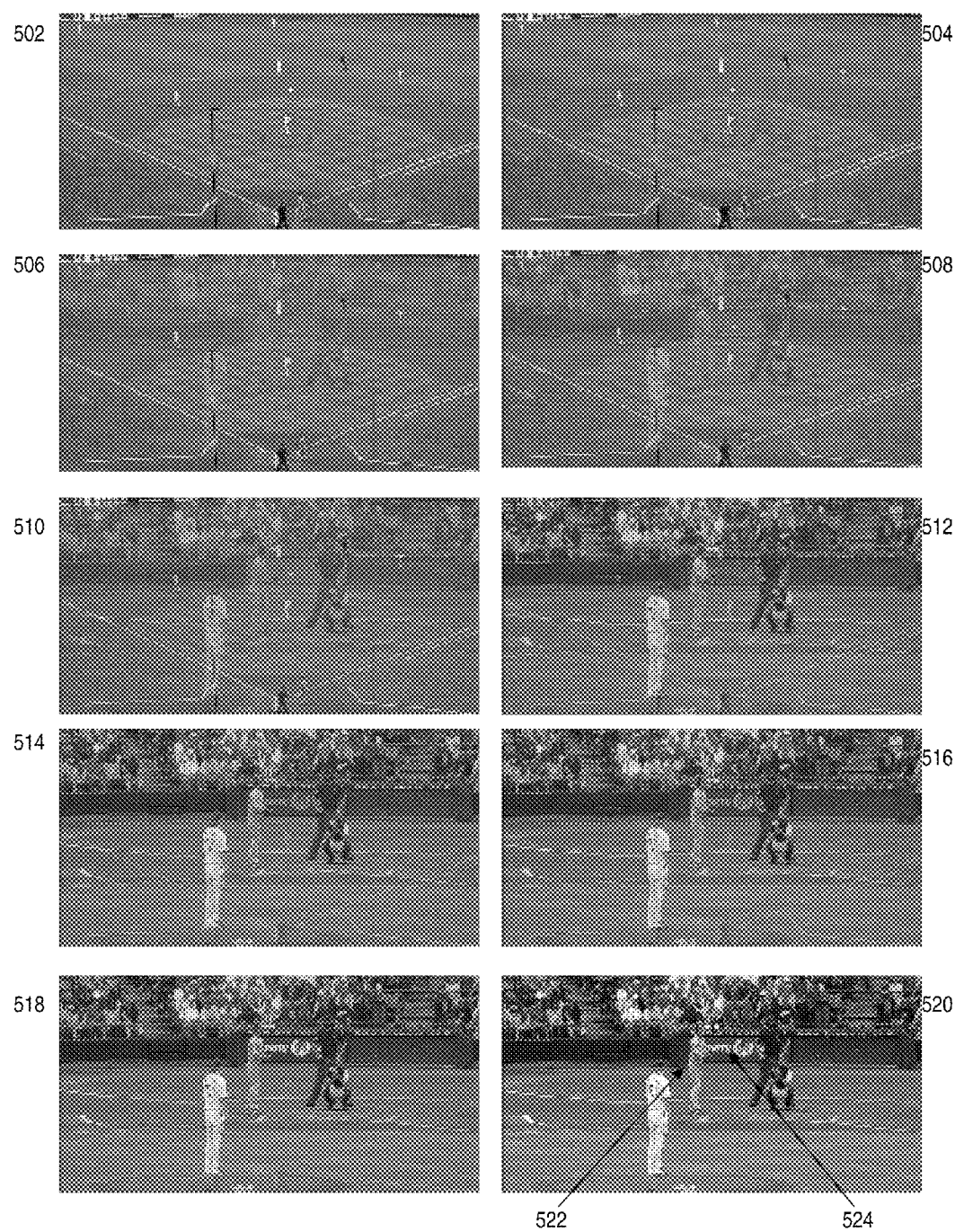
FIG. 5 is an example of a dissolve in baseball where even though recognition occurred after the dissolve completed the virtual insert, an advertisement on the back wall was inserted within the dissolve, according to an embodiment.

FIG. 5 shows an example of how backpropagation helps insert the video insertion in a baseball video stream during a dissolve, according to an embodiment. The original scene is labeled 502. The stream begins dissolving to a new scene at label 504. The search algorithm only recognized the scene at label 520. The transition detector marked the start and end of the dissolve in the buffer at label 506 and label 518. When recognition occurs on label 520 the recognition camera is propagated backwards in time through the backpropagation data buffer so that each default track camera is replaced with a valid recognition camera. The opacity of the insertion is also modified based on the start and end points of the detected dissolve. The end result is that the virtual advertisement 524 appears to dissolve into the new scene along with its background albeit at a slightly different rate. By careful tuning of the transition detector, the effect is almost imperceptible to someone viewing the scene. In the case of scene cuts, the virtual insertion is displayed on the exact scene cut boundary with no visual artifacts. Graphical effects used to transition between two scenes are also handled so as to have minimal or no delay artifacts depending on the type of effect used for the transition. An insert may take into account occlusions, such as player 522.

Backpropagation may use a reliable method of finding scene boundaries, according to an embodiment. The "cut" is typically the predominant scene discontinuity in most video streams and as such needs to be detected reliably. Among the possible techniques for reliable scene boundary detection in video streams is the idea of generating ordinal signatures for scenes and using the matching—or lack of matching of the ordinal signals to detect the dissimilarity between adjacent frames across a scene boundary in video streams. Another possible method of detecting scene boundaries is the used of edge and/or color matching metrics, typically in conjunction along with a coarse block tracking algorithm. Such a technique may be used to detect dissolves.

Figure 6:
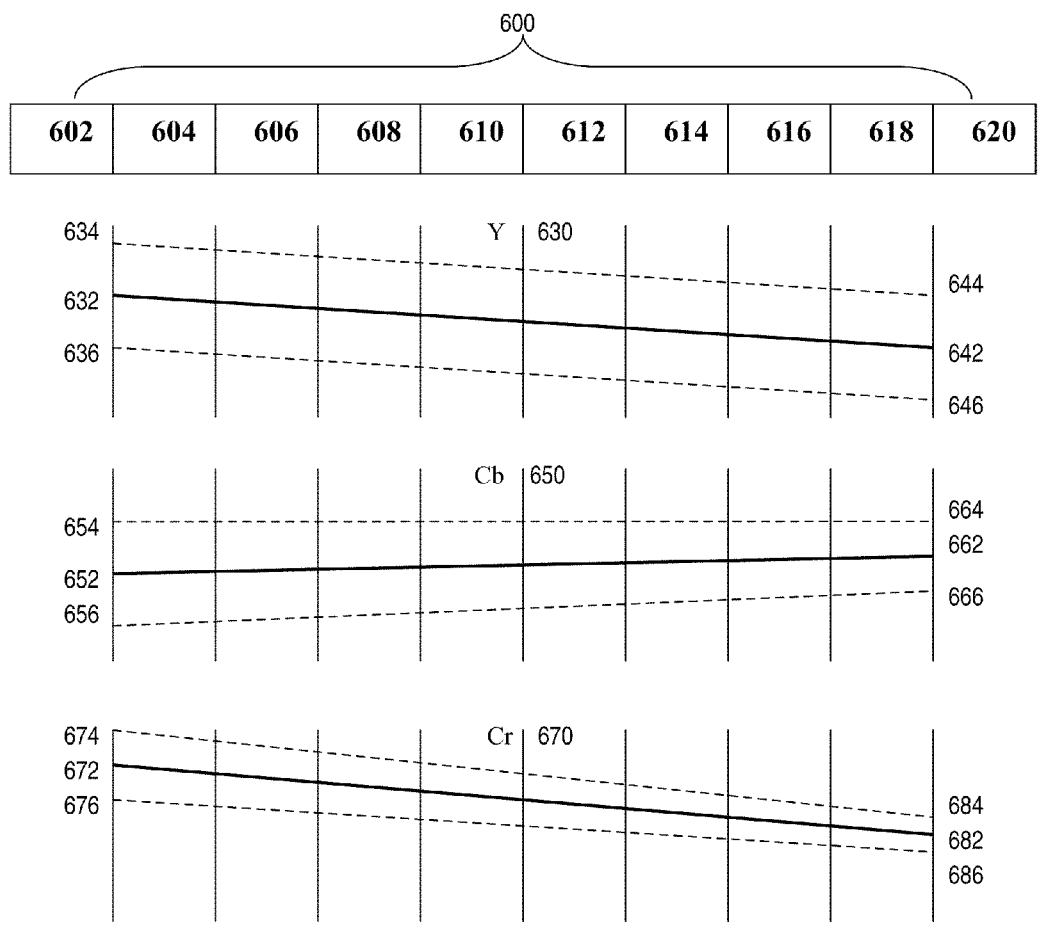
FIG. 6 is an example of backpropagation of occlusion color analysis, according to an embodiment.

FIG. 6 demonstrates the occlusion color processing that may be associated with the sequence of frames in FIG. 5, according to an embodiment. The image buffer 600 consists of frames 602 to 620, which corresponds to the images 502 to 520 respectively in FIG. 5. The Occlusion subsystem may rely on the dominant color in the insert region to discriminate the foreground objects from background with a relatively uniform color. The plots (630, 650, and 670) may illustrate the individual component color channel levels (Y, Cb and Cr) of the insertion region versus the frame buffer in 600. For the linear transition in FIG. 5, the average dominant color values (Y, Cb, Cr) may vary linearly from brown dirt color (632, 652, 672) in frame 602 to green wall color (642, 662, 682) in frame 620. Since even the most uniform color regions typically have color variations, the occlusion subsystem may utilize a range around the dominant color components. There are linear upper colors bounds for the Y (634 to 644), Cb (654 to 664) and Cr (674 to 684) channels as well as linear lower color bounds for the Y (636 to 646), Cb (656 to 666) and Cr (676 to 686) channels. The width of the range be wider for the brown dirt (frame 602) than the green wall (frame 620), and may vary linearly in between. Typical color value for brown dirt may be Y=102, Cb=115, Cr=153; and typical color for a green back wall may be Y=72, Cb=111, Cr=114.

There are a number of approaches that the color processing associated with FIG. 6 may be implemented in the occlusion subsystem, according to embodiments of this invention. For example, a backpropagation camera model buffer may be used to find the potential location of the insertion region in each of the intermediate frames of FIG. 5. First, the color processing may be determined iteratively forward in time from frame 602 to 620, possibly with frame to frame smoothing of the dominant color components and/or the color component ranges. The challenge may be to reliably detect the initial brown dirt color that is very different from the green wall color, particularly when the initial color is a multiple color portion of the scene such as spectator seating. Second, the color processing may be determined iteratively backwards in time from frame 620 back to 602, possibly with the same frame to frame smoothing of the dominant color components and/or the color component ranges. This approach may have the advantage that color estimate for a given field may assist in the "search" of color for the previous field, which is analyzed next in this reverse processing. In this manner, the color of the potentially different brown dirt may be gradually "learned" by backpropagating the color information through the transition.

A mask or key may be generated at each of the iterative processes in the first and second methods above, according to a further embodiment. As an alternate approach, the color analysis may be performed over the entire transition prior to generate the occlusion mask. This may permit a linear fit of the dominant color across the frame buffer, potentially improving further the reliability of the detected color. This may be applied to either the first or second methods. Other data fitting strategies may apply depending on the type of transition. Determining appropriate ranges to the color component may be an important in the occlusion process. The color ranges may be iteratively learned using color variance computations or histogram processing such as in U.S. Pat. No. 7,015,978, which is incorporated by reference. Performing the analysis backwards in time may be particularly advantageous for cases that the scene transition blends a high variance portion of the scene such as stadium seating with the image of the target area for insertion. The color range may need to be increased when the transition involves areas with high variance.

Embodiments of this invention may extend the backpropagation of frame to frame color analysis to spatial information as well. For example, contour information may be "detected" for occluding objects in the final frame 520 in FIG. 5. The contour information may be tracked spatially in image space backwards in time from frame 520 to 502, using frame to frame matching of the object boundary. This permits the gradual "relearning" of the contour boundary as it changes in the scene transition. The tracking itself may utilize frame to frame affine tracking of the entire scene to assist stabilizing the outline computation. Contour tracking may be combined with general color range processing as described for FIG. 6. Alternately, backpropagation of the camera model may be used to position a spatial color reference as detailed, for example, in U.S. Pat. No. 5,953,076, which is incorporated by reference. This strategy may be useful for situations where the insertion region comprises of multiple colored regions, and may be combined with contour processing or generic occlusion processing outlined above. In one embodiment, the key generated for a given frame may be used in the previous frame, which is applicable for cases in low camera or object motion. The occlusion key may be shifted or warped to account for gentle camera motion.

Figure 7:
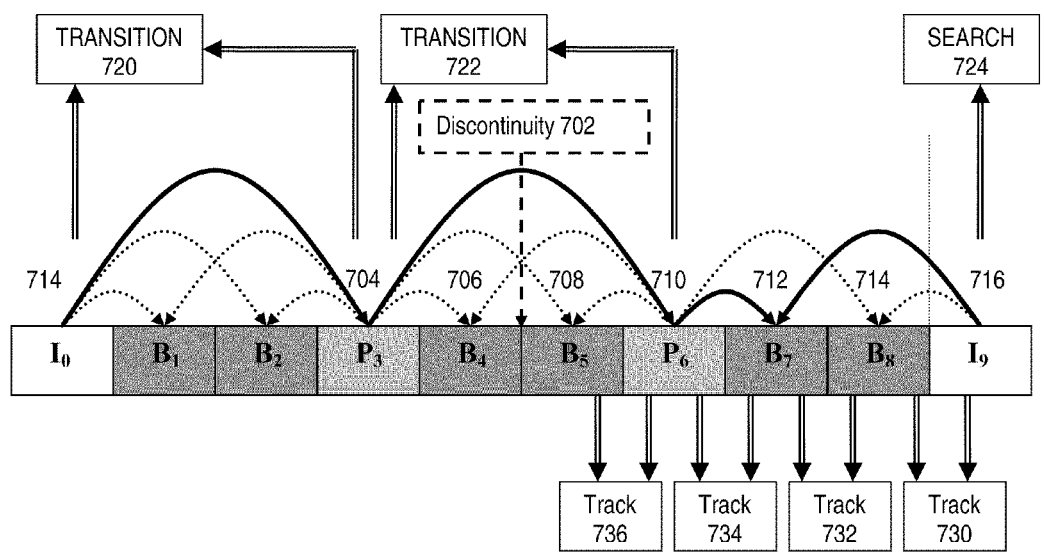
FIG. 7 is an insertion system process for a compressed video sequence, according to an embodiment.

One embodiment utilizes the structure of video compression to guide the application of backpropagation. FIG. 7 details a group of pictures from a compressed stream of images. Frames zero 714 and nine 716 may be intra-coded frames that are compressed independently of any other frames in the original video sequence. Frames three and six may be predictively coded frames that depend on a previously coded frame (frames zero and three respectively). The remaining frames may be bi-directionally predicted frames, which are coded on both previously and future coded frames (intra-code I-frame or predictive P-frame). For example, the bi-direction frame $B_7$ is dependent on the intra-code frame $I_9$ and Predictive $P_6$. $I_9$ is independently coded, but $P_6$ depends on Predictive coded frame $P_3$ (708), which in turn depends on the intra-code frame $I_0$. In alternate compression schemes, the intermediate frames from multiple of frames in the group of pictures, both forward and backwards in time.

Discontinuities in the video sequence may degrade the compression performance, as motion vector prediction fails to model the changes between frames. This degradation in image quality may adversely affect image processing modules such as transition, search and track. This may be particularly true for intermediate frames that dependent on other frames in the sequence, such as predictive B-frames and P-frames. For example, a scene discontinuity 702 between the bi-directional frames $B_4$ 706 and $B_5$ 708 affect the coding of both of these frames since prediction from adjacent Predictive frames $P_3$ 704 and $P_6$ 710 crosses the discontinuity. This may affect the prediction of $P_6$ 710 that depends on predictive frame $P_3$ 704, which in turn may affect the prediction of successive bi-directional frames $B_7$ 712 and $B_8$ 714. $I_9$ is independently coded and hence should not be affected by the discontinuity. Randomly selecting images in the group of pictures for processing may be inefficient, as multiple frames in the group of pictures may be examined to find ones with sufficient quality for the image processing modules to succeed. It could be beneficial to use the type of compression frame as a guide to which image has the highest quality.

In one embodiment of the invention, the transition module operates on frame synchronized with the compression frame type in a group of pictures. The transition module may process successive predictive P-frames or intra-code I-frames to determine whether a discontinuity occurred. For example, transition module 720 may compare intra-coded frame $I_0$ with predictive coded $P_3$, and detect no discontinuity. Furthermore, transition module 722 may compare predictive coded frames $P_3$ with $P_6$, and determine that a discontinuity occurred, such as 702. In another embodiment, a transition module compares successive intra-code frames, or the transition module used multiple predictive P-frames and intra-code I-frames. In a further embodiment, the transition module detects a scene transition utilizing the motion vector and error correction map between video frames, such that is used to create P-frames from the previous P-frame or I-frame.

In an embodiment of the invention, the search process is synchronized with the more reliable frames (I-frame or P-frames) in the compression sequence. For example, the search module may process the intra-coded frame $I_9$, since it is the first frame following 702 not to be affected by the discontinuity. The track module may determine frame-to-frame motion for combination of frames working backward from $I_9$. This may include Track 730 from frames 8 to 9, Track 732 for frames 7 to 8, Track 734 for frames 6 to 7 and Track 736 for frame 5 to 6. As discussed above, the camera model for the key frame $I_9$ may be backpropagated back to bi-directional frame $B_5$ using tracking steps (730, 732, 734 and 736). The insertion process (not shown) would be dependent on the camera model generated for specific frames.

Track module 106 may be configured to track points of interest within the video, according to an embodiment. U.S. Pat. No. 6,741,725, described by Astle and incorporated by reference, uses frame to frame motion of texture blocks in the video to derive a camera model for the scene. An iterative technique may be employed to find the dominant camera motion by eliminating motion of outlier blocks. In a specific embodiment of this invention, the frame to frame camera model may be determined in part from the motion vector used to compute the intermediate frames from supporting images in the sequence, such as determining bi-directional frames from supporting P-frame or I-frame. A similar sort routine may be applied to the frame to frame motion vectors to determine the dominant motion in the scene, and hence may be used with the search model to determine the camera model for the current frame.

Figure 8:
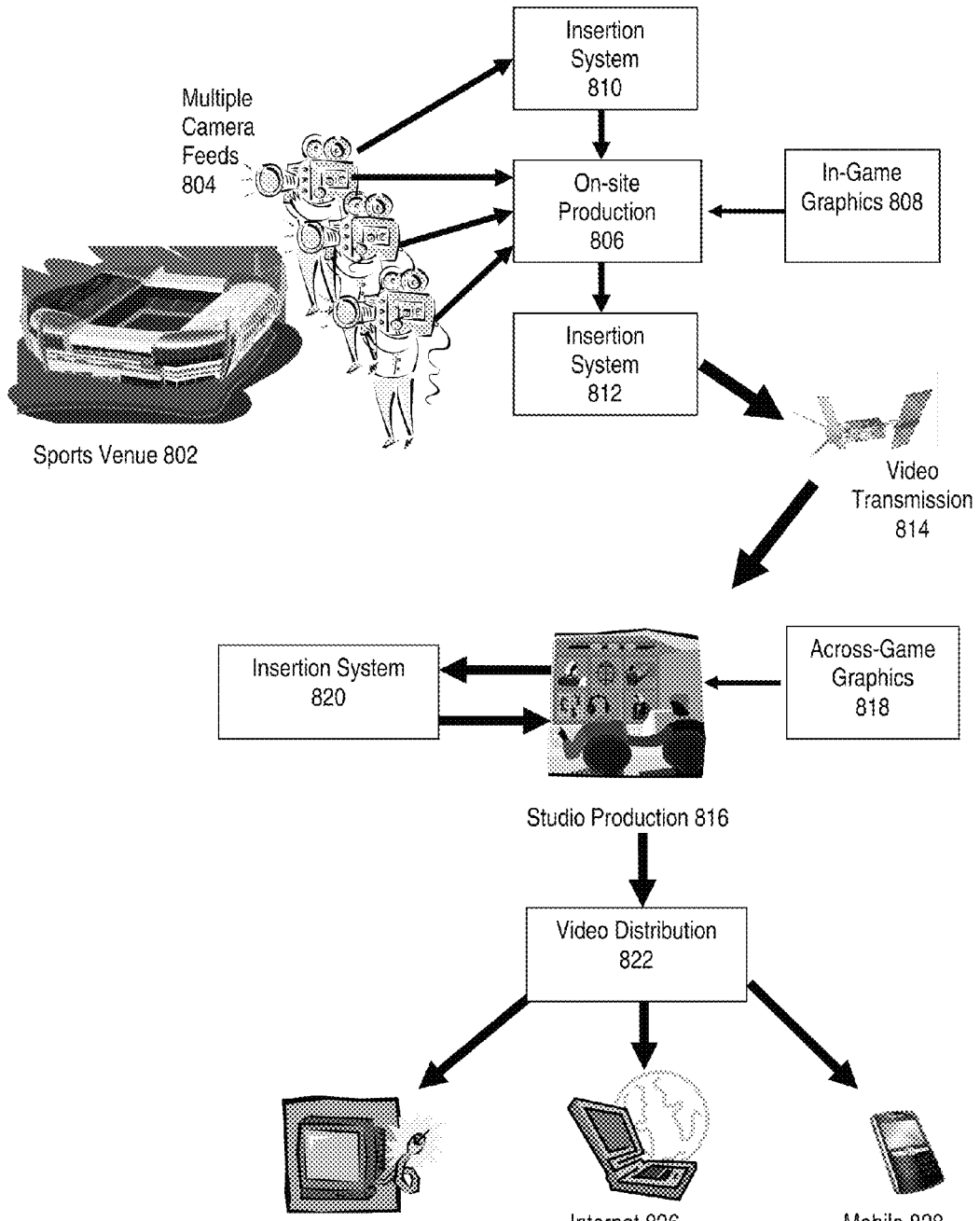
FIG. 8 is a sample video production and distribution pipeline for a live sporting event, according to an embodiment.

Embodiments may utilize backpropagation to integrate virtual insertions on-site at different stages of the video pipeline, as illustrated in FIG. 8. The contest at a sports venue 802 may be covered by multiple video cameras 804, and the video feeds are sent to an on-site production 806, where the videos are spliced into a single program feed with inserted in-game graphics 808. The virtual insertion system may modify a dedicated camera video feed 810 upstream to the switcher without in-game graphics. Backpropagation may be useful to recover from scenarios where the camera transitions from a highly zoomed shot to a wide shot, such as zooming out from the view of a football coach's face to a wide shot covering the start of the football play. Alternately, the virtual insertion system may modify the program video feed at the end of the on-site broadcast production 812, which may contain on-screen graphics and video effects at the transitions between the multiple camera feeds. This may be a preferred location over the dedicated camera position 810 since a single system may integrate graphics into video of multiple cameras. Backpropagation of camera models may be particularly advantageous for seamlessly handling the transition between difference cameras of the production. The image sequence of FIG. 5 is an example of a camera to camera transition effect downstream of a video switcher in the on-site broadcast production 806.

Embodiments of the present invention may utilize backpropagation to integrated virtual insertion at different stages of the video pipe-line remote from the venue, as, for example, illustrated in FIG. 8. The program video feed is transmitted 814 to a remote location such as a broadcast studio production 816, where graphics summarizing the results from other sporting event contests (across-game graphics) are integrated into the video 818. The transmission shown in the FIG. 8 is a satellite image, but other methods such as fiber optic connectivity may apply. The virtual insertions may be integrated in the video using an insertion system 820, either before or after across-game graphics are inserted into the program video. This may be a preferred location over on-site positions since a single system may handle back-to-back events from on-site productions in different parts of the country. Furthermore, a single system may be able to generate two different video feeds with different insertions, to be transmitted to different broadcast markets. Backpropagation may be used to mediate the on-site production video effects at a location remote from the venue. The sequence demonstrated in the FIG. 5 is representative of footage captured in broadcast studios geography distant from on-site productions. Backpropagation of the camera model may also help with cases where recognition may be delayed due to the across-game graphics, possibly covering the lower ⅓ of the screen 818. The video with virtual insertions goes through a video distribution chain 822, where it is provide to the television platform 824, or interne platform 826, or the mobile platform 828. The virtual insertion may be integrated at the user application level, such as detailed in U.S. patent application Ser. No. 12/424,056, which is incorporated by reference.

In an embodiment, the present invention integrates virtual insertions in video with object based occlusion at a remote location from an on-site production using video analysis of the broadcast video. These may include but are not limited to a broadcast studio, regional cable head-end, local cable head-end, cable node, set-top box, computer system, computing device, mobile device, etc. In another embodiment, the video analysis happens on-site or in a remote location (studio, regional cable head-end, etc), and the information is propagated downstream in the distribution chain where the insertion is integrated (regional cable head-end, local cable head-end, cable node, set-top box). In yet another embodiment, object detection information is sent from the venue to a remote location to be used by a virtual insertion system to integrate virtual graphics into video with or without occlusion.

Embodiments of the present invention may also be extended to video object tracking applications. Athletes and other objects may be automatically tracked in moving video from PTZ (Pan Tilt Zoom) professional or consumer cameras, as detail in patents such as U.S. patent application Ser. No. 12/403,857 by Gefen et al., which is incorporated by reference. This may be realized by applying image processing techniques to detecting and tracking regions in the video images corresponding to players or other objects of interest. The camera models for the video images may be used to translate the motion of object in images to the motion of the objects in real world coordinates. This may allow the derivation of statistical measures relative to real-world position, such as the distance between players or the speed of a particular player. It may be possible to derive real-world statistical measures without deriving 3D real-world position, as detailed in U.S. patent application Ser. No. 12/507,708 by House, which is incorporated by reference.

There are at least two ways that backpropagation may be used in conjunction with automated object tracking. According to a first embodiment, backpropagated camera models may be used to perform the association of an object image position and a real-world position. This may enable object positions to be derived for video frames immediately following a scene transition or other video effect causing tracking failure. For example, the physical trail position of a zoomed in shot of a basketball player driving to the basket may be derived after the camera zooms out enough for recognition to succeed. The image space locations may be stored in conjunction with the default camera models (FIG. 2), and actual physical 3D object positions (or alternate representation) may be generated when the recognition camera is backpropagated to the corresponding frame.

According to a second embodiment, backpropagation may be applied to the object tracking information itself. It may be advantageous in some scenarios to perform the object tracking backwards in time. For video sequences that vary dramatically in zoom, automatically detecting objects in video may be challenging since a large object in video zoomed out may have the same image size as an small object in video zoomed in. When the camera model is known for a particular frame, an object may be checked against expected real-world size and filtered accordingly. For example, a hockey player may typically vary in height above the ice from 4.5 to 6.5 feet depending on how low their crouch is. Consequently, the hockey players may be automatically detected in a frame with recognition by using expected physical dimensions, and the players positions may be tracked backwards in time toward a scene transition, which is essentially backpropagating the player positional information.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

We claim:

1. A computer-implemented method for video insertion using backpropagation for a sequence of video frames comprising:
   determining a first camera model at least in part from a first frame of the sequence;
   determining a transition location in the sequence based on a transition, wherein the transition location is earlier in the sequence than the first frame;
   generating a transform model based on an analysis of the first frame and a previous frame in the sequence;
   generating a previous camera model for the previous frame by applying the transform model to the first camera model; and
   inserting an insertion into one or more frames prior to the first frame and between the previous frame and the transition location based on the previous camera model, wherein the inserting is performed before displaying the one or more frames on a display device.

2. The computer-implemented method of claim 1, further comprising repeating the applying step to generate a camera model for the one or more frames and inserting the insertion based on the camera model for the one or more frames.

3. The computer-implemented method of claim 2, wherein the repeating step further includes generating a transform model based on an analysis between a frame and a further prior frame and applying the transform model to the further prior frame to generate camera models for the one or more frames.

4. The computer-implemented method of claim 1, wherein a portion of the transition location is produced in part by a camera different than the camera that produced the first frame.

5. The computer-implemented method of claim 1, wherein the applying a transform model includes inverting the transform model.

6. The computer-implemented method of claim 1, wherein the determining a transition includes detecting a transition between frames.

7. The computer-implemented method of claim 1, wherein the determining a transition includes receiving transition information regarding a transition in the sequence.

8. The computer-implemented method of claim 1, wherein the generating a transform model includes determining a level of opacity for the insertion based on the transition and a frame position in the one or more frames, and wherein the inserting includes applying opacity to the insertion based on the transform model.

9. The computer-implemented method of claim 1, further comprising determining occlusion information based on an occlusion in the one or more frames, and wherein the inserting includes processing the insertion based on the occlusion information.

10. The computer-implemented method of claim 9, wherein the determining occlusion information includes determining color occlusion information based on the transition and a frame position in the one or more frames, and wherein the inserting includes processing the insertion based on the color occlusion information.

11. The computer-implemented method of claim 9, wherein the determining occlusion information includes determining spatial information based on the transition and a frame position in the one or more frames, and wherein the inserting includes processing the insertion based on the spatial information.

12. The computer-implemented method of claim 1, wherein the inserting includes inserting the insertion in a broadcast video.

13. The computer-implemented method of claim 2, wherein the repeating includes selecting the one or more frames for modeling based on video compression information for the sequence.

14. The computer-implemented method of claim 13, wherein the repeating includes using the video compression information to generate transform models for the selected frames.

15. The computer-implemented method of claim 1, wherein the determining, generating, applying and inserting steps are performed in real time.

16. The computer-implemented method of claim 1, further comprising determining object tracking information for one or more objects located in images of the video sequence, and wherein the generating a transform module includes generating a transform module based on the object tracking information.

17. A system for video insertion using backpropagation for a sequence of video frames comprising:
   a search subsystem configured to determine a first camera model at least in part from a first frame of the sequence;
   a transition subsystem configured to determine a transition location of the sequence based on a transition, wherein the transition location is earlier in the sequence than the first frame;
   a track subsystem configured to:
      generate a transform model based on an analysis of the first frame and a previous frame in the sequence;
      generate a previous camera model for the previous frame by applying the transform model to the first camera model; and
   an insertion subsystem configured to insert an insertion into one or more frames prior to the first frame and between the previous frame and the transition location based on the previous camera model, wherein the insert is performed before the display of the one or more frames on a display device.

18. The system of claim 17, wherein the track subsystem is further configured to:
repeat the apply step to generate a camera model for the one or more frames based on an analysis of a frame and a further prior frame; and
insert the insertion based on the camera model for the one or more frames.

19. The system of claim 17, wherein a portion of the transition location is produced in part by a camera different than the camera that produced the first frame.

20. The system of claim 17, wherein the track subsystem is further configured to apply an inverted transform model.

21. The system of claim 17, wherein the track subsystem is further configured to generate a transform model based on an analysis between a frame and a further prior an earlier frame and apply the transform model to the further prior frame.

22. The system of claim 17, wherein the track subsystem is further configured to determine a level of opacity for the insertion based on the transition and a frame position in the one or more frames, and wherein the insertion subsystem is further configured to apply opacity to the insertion based on the transform model.

23. The system of claim 17, further comprising an occlusion subsystem configured to determine occlusion information based on an occlusion in the one or more frames, and wherein the inserting includes processing the insertion based on the occlusion information.

24. The system of claim 17, wherein the insertion subsystem is further configured to insert the insertion in a broadcast video.

25. The system of claim 17, wherein the track subsystem is further configured to use video compression information of the sequence to select the one or more frames.

26. The system of claim 25, wherein the track subsystem is further configured to use the video compression information to generate camera models for the selected frames.

27. The system of claim 17, wherein the search, transition, track and insertion subsystems are configured to perform in real time.

28. A computer-implemented method for video insertion using backpropagation for a sequence of video frames comprising:
determining a first camera model at least in part from a first frame of the sequence;
generating a previous camera model for a previous frame by applying a transform model to the first camera model, wherein the transform model is based on an analysis of the first frame and the previous frame in the sequence; and
inserting an insertion into one or more frames between the first frame and an earlier index frame of the sequence based on the previous camera model, wherein the generating and inserting are performed in real time before displaying the one or more frames on a display device.

29. The computer-implemented method of claim 28, further comprising repeating the generating for the one or more frames by applying a camera model generated by an analysis of a frame and a further prior frame and inserting the insertion based on the camera model for the one or more frames.

30. The computer-implemented method of claim 28, wherein the inserting includes inserting the insertion such that the insertion appears in a camera field of view based on changes in camera parameters.

31. The computer-implemented method of claim 30, wherein the change in camera parameters includes a change in zoom level.

32. A system for video insertion using backpropagation for a sequence of video frames comprising:
a search subsystem configured to determine a first camera model at least in part from a first frame of the sequence;
a track subsystem configured to generate a previous camera model for a previous frame by applying a transform model to the first camera model, wherein the transform model is based on an analysis of the first frame and the previous frame; and
an insertion subsystem configured to insert an insertion into one or more frames between the first frame and an earlier index frame of the sequence based on the previous camera model, wherein the insertion is performed in real time before the one or more frames are displayed on a display device.

33. The system of claim 32, wherein the track subsystem if further configured to:
repeat the generation for the one or more frames by applying a camera model generated by an analysis of a frame and a further prior frame; and
insert the insertion based on the camera model for the one or more frames.

34. The computer-implemented method of claim 32, wherein the insertion subsystem is further configured to insert the insertion such that the insertion appears in a camera field of view based on changes in camera parameters.

* * * * *